United States Patent
Liu et al.

(10) Patent No.: US 7,959,704 B2
(45) Date of Patent: *Jun. 14, 2011

(54) FIBROUS ALUMINUM TITANATE SUBSTRATES AND METHODS OF FORMING THE SAME

(75) Inventors: James Jenq Liu, Mason, OH (US); Bilal Zuberi, Cambridge, MA (US); William M. Carty, Alfred Station, NY (US)

(73) Assignee: GEO2 Technologies, Inc., Woburn, MA (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/263,004

(22) Filed: Oct. 31, 2008

(65) Prior Publication Data

US 2009/0092786 A1 Apr. 9, 2009

Related U.S. Application Data

(63) Continuation-in-part of application No. 11/323,429, filed on Dec. 30, 2005, now abandoned.

(60) Provisional application No. 60/737,237, filed on Nov. 16, 2005.

(51) Int. Cl.
*B01D 39/20* (2006.01)
*F01N 3/022* (2006.01)

(52) U.S. Cl. ...... 55/523; 55/282.3; 55/385.3; 55/DIG. 5; 55/DIG. 10; 55/DIG. 30; 60/311; 210/509; 210/510.1; 422/180; 264/628; 264/630; 264/DIG. 48; 428/116

(58) Field of Classification Search ............. 55/282.3, 55/385.3, 523, DIG. 5, DIG. 10, DIG. 30; 60/311; 210/509, 510.1; 422/177, 180; 264/628, 264/630, DIG. 48; 501/5, 32, 127, 134, 136; 428/116

See application file for complete search history.

(56) References Cited

U.S. PATENT DOCUMENTS

| | | | |
|---|---|---|---|
| 1,993,821 A | 3/1935 | Benner et al. | |
| 3,819,334 A | 6/1974 | Yoshida et al. | |
| 3,961,907 A | 6/1976 | Close et al. | |
| 4,047,965 A | 9/1977 | Karst et al. | |
| 4,053,011 A | 10/1977 | Riewald et al. | |
| 4,416,676 A * | 11/1983 | Montierth | 55/523 |
| 4,419,108 A | 12/1983 | Frost et al. | |
| 4,420,316 A | 12/1983 | Frost et al. | |
| 4,608,361 A | 8/1986 | Kanamori et al. | |
| 4,828,785 A | 5/1989 | Newkirk et al. | |
| 4,868,142 A | 9/1989 | Waisala | |
| 5,053,092 A | 10/1991 | Lachman | |
| 5,098,455 A | 3/1992 | Doty et al. | |
| 5,123,243 A | 6/1992 | Baddour | |
| 5,126,431 A | 6/1992 | Nesheiwat | |
| 5,153,057 A | 10/1992 | Corbett | |

(Continued)

OTHER PUBLICATIONS

"Diesel Filter Materials", *DieselNet Technology Guide*, www.DieselNet.com, (Jan. 2003).

(Continued)

*Primary Examiner* — Jason M Greene (57) ABSTRACT

A porous fibrous honeycomb substrate having an aluminum titanate composition and methods of producing the same are provided herein. Precursors of aluminum titanate are provided in an extrudable mixture that includes fiber materials to form a green honeycomb substrate. When cured, the precursors of aluminum titanate form an aluminum titanate composition, with the fiber materials defining the porous microstructure. Various composite structures including aluminum titanate are provided to form a porous honeycomb substrate that can be configured to be filtration media and/or a catalytic host.

22 Claims, 3 Drawing Sheets

U.S. PATENT DOCUMENTS

| | | | |
|---|---|---|---|
| 5,194,407 A | 3/1993 | Waisala et al. | |
| 5,207,807 A | 5/1993 | Manfre et al. | |
| 5,249,948 A | 10/1993 | Koslow | |
| 5,251,564 A | 10/1993 | Rim et al. | |
| 5,298,046 A | 3/1994 | Piesert | |
| 5,335,712 A | 8/1994 | Corbett et al. | |
| 5,338,253 A | 8/1994 | Damsohn et al. | |
| 5,376,341 A | 12/1994 | Gulati | |
| 5,492,580 A | 2/1996 | Frank | |
| 5,518,833 A | 5/1996 | Repplinger et al. | |
| 5,611,831 A | 3/1997 | Matsuoka et al. | |
| 5,623,013 A | 4/1997 | Tanaka et al. | |
| 5,662,731 A | 9/1997 | Andersen et al. | |
| 5,681,373 A | 10/1997 | Taylor et al. | |
| 5,846,276 A * | 12/1998 | Nagai et al. | 55/523 |
| 5,900,207 A | 5/1999 | Danforth et al. | |
| 6,040,266 A | 3/2000 | Fay et al. | |
| 6,057,030 A | 5/2000 | Mano | |
| 6,179,460 B1 | 1/2001 | Burkhardt et al. | |
| 6,238,618 B1 | 5/2001 | Brundage et al. | |
| 6,375,450 B1 | 4/2002 | Golumb et al. | |
| 6,444,006 B1 | 9/2002 | Haberkamp et al. | |
| 6,613,384 B1 | 9/2003 | Waller | |
| 6,651,773 B1 | 11/2003 | Marocco | |
| 6,669,751 B1 * | 12/2003 | Ohno et al. | 55/523 |
| 6,860,917 B2 | 3/2005 | Henrichsen et al. | |
| 6,935,461 B2 | 8/2005 | Marocco | |
| 7,052,532 B1 | 5/2006 | Liu et al. | |
| 7,071,135 B2 * | 7/2006 | Ogunwumi et al. | 501/134 |
| 7,179,516 B2 | 2/2007 | Ichikawa | |
| 7,259,120 B2 * | 8/2007 | Ellison et al. | 501/134 |
| 7,572,311 B2 * | 8/2009 | Zuberi | 55/523 |
| 7,862,641 B2 * | 1/2011 | Zuberi et al. | 55/523 |
| 2002/0157358 A1 | 10/2002 | Noda et al. | |
| 2003/0127393 A1 | 7/2003 | Tepper et al. | |
| 2004/0020846 A1 * | 2/2004 | Ogunwumi et al. | 210/510.1 |
| 2004/0092381 A1 | 5/2004 | Beall et al. | |
| 2004/0194505 A1 | 10/2004 | Wang et al. | |
| 2004/0206062 A1 * | 10/2004 | Ichikawa | 55/523 |
| 2004/0231307 A1 | 11/2004 | Wood et al. | |
| 2005/0049362 A1 | 3/2005 | Buckley et al. | |
| 2005/0091952 A1 * | 5/2005 | Ogunwumi et al. | 55/523 |
| 2005/0102987 A1 | 5/2005 | Kudo | |
| 2005/0109023 A1 | 5/2005 | Kudo et al. | |
| 2005/0126140 A1 | 6/2005 | Ito et al. | |
| 2005/0247038 A1 | 11/2005 | Takahashi | |
| 2005/0266991 A1 | 12/2005 | Ohno et al. | |
| 2006/0075731 A1 | 4/2006 | Ohno et al. | |
| 2007/0032370 A1 | 2/2007 | Weisensel et al. | |
| 2007/0044443 A1 | 3/2007 | Nixdorf et al. | |
| 2007/0261557 A1 | 11/2007 | Gadkaree et al. | |
| 2008/0010960 A1 | 1/2008 | Paisley et al. | |
| 2008/0179782 A1 | 7/2008 | Liu et al. | |
| 2009/0220734 A1 * | 9/2009 | Backhaus-Ricoult et al. | 428/116 |

OTHER PUBLICATIONS

"Wall-Flow Monoliths", *DieselNet Technology Guide*, www.DieselNet.com, (Sep. 2005).

"Ceramic Catalyst Substrates", *DieselNet Technology Guide*, www.DieselNet.com, (Apr. 1997).

"Ceramic Fibers and Cartridges", *DieselNet Technology Guide*, www.DieselNet.com, (Jul. 2001).

Cooke, Theodore F., "Inorganic Fibers—A Literature Review", *J. Am. Ceram. Soc.*, 74 (12), (1991),2959-2978.

Miller, Robert K., et al., "Design, Development and Performance of a Composite Diesel Particulate Filter", *SAE Technical Paper Series*, 2002-01-0323, (Mar. 2002).

Li, Cheng G., et al., "Properties and Performance of Diesel Particulate Filters of an Advanced Ceramic Material", *SAE Technical Paper Series*, 2004-01-0955, (Mar. 2004).

* cited by examiner

FIBROUS ALUMINUM TITANATE SUBSTRATES AND METHODS OF FORMING THE SAME

CROSS-REFERENCE TO RELATED APPLICATIONS

This application is a continuation-in-part of U.S. patent application Ser. No. 11/323,429 filed on Dec. 30, 2005 and entitled "Extruded Porous Substrate and Products Using the Same," which claims the benefit of provisional application Ser. No. 60/737,237, filed on Nov. 16, 2005. The entire disclosures of application Ser. Nos. 11/323,429 and 60/737,237 are herein incorporated by reference.

BACKGROUND OF THE INVENTION

1. Field of the Invention

The invention related generally to fibrous aluminum titanate materials, and more particularly to aluminum titanate and aluminum titanate composite materials including a plurality of fibers composed of aluminum titanate materials.

2. Background

Advanced ceramic materials are commonly utilized in systems located in hostile environments, such as, for example, automotive engines (e.g., catalytic converters), aerospace applications (e.g., space shuttle titles), refractory operations (e.g., firebrick) and electronics (e.g., capacitors, insulators). Porous ceramic bodies are of particular use as filters in these environments. For example, today's automotive industry uses ceramic honeycomb substrates (i.e., a porous ceramic body) to host catalytic oxidation and reduction of exhaust gases, and to filter particulate emissions. Ceramic honeycomb substrates provide high specific surface area for filtration and support for catalytic reactions and, at the same time, are stable and substantially structurally sound at high operating temperatures associated with an automotive engine environment.

In general, ceramic materials, such as for example, aluminum titanate based ceramics, are inert materials that perform well in high temperature environments. However, ceramic materials are not immune to thermal stresses, such as those stresses generated from high thermal gradients and environments that subject the material to thermal excursions between temperature extremes. The performance of ceramic materials exposed to extreme thermal environments is even further challenged when highly porous properties are desired, such as in filtration applications. High porosity aluminum titanate substrate materials as a filtration media and/or catalytic host in high temperature environments are known to degrade and fail in many applications.

BRIEF SUMMARY OF THE INVENTION

This invention overcomes the disadvantages of the prior art by providing a high porosity substrate having a composition of aluminum titanate with mechanical integrity resulting from a rigid fibrous microstructure. The substrate of the present invention is suitable for use in rigorous environments such as high temperature environments as a filtration media and/or catalytic host.

In an aspect of the present invention, a fibrous aluminum titanate honeycomb substrate includes a honeycomb array of walls defining channels between adjacent walls, that are composed of a plurality of fibers forming a porous structure having an open network of pores. In this embodiment, the fibrous aluminum titanate microstructure provides porosity from the open network of pores that is greater than 50% porous. A bonding matrix is formed between adjacent ones of the plurality of fibers to provide rigidity and strength in the structure. The bonding matrix can be glass, glass-ceramic, and ceramic materials, including aluminum titanate. Various composite materials can be formed, including aluminum titanate with at least one of silicon dioxide, strontium oxide, magnesium oxide, barium oxide, and calcium oxide.

Methods of manufacturing the porous aluminum titanate substrate include mixing precursors to aluminum titanate, i.e., aluminum oxide and titanium dioxide, the precursors, with additives and a fluid to provide an extrudable mixture. The precursors and/or additives include a fiber. The extrudable mixture is extruded into a green honeycomb substrate, and cured into a fibrous aluminum titanate porous substrate. The curing process includes drying the green substrate and removing the additives, followed by a sintering process that forms aluminum titanate from the precursors while maintaining the pore structure defined by the fiber.

The methods of manufacturing a porous fibrous aluminum titanate substrate include stoichiometric aluminum titanate formed from an approximately equal molar ratio of alumina and titanium dioxide. Variations include composite structures that resulting from excess alumina, excess silica, and additional compositions.

The porous fibrous aluminum titanate substrate of the present invention can have porosity in the range of about 50% to about 85%, formed of bonded ceramic fibers having a composition of aluminum titanate. The bonded ceramic fibers can be bonded with a bonding matrix with glass bonds, glass-ceramic bonds or ceramic bonds, or any combination thereof. In an embodiment, the bonding matrix is aluminum titanate, and in other embodiments, the bonding matrix is a composite matrix of aluminum titanate and silicon dioxide, strontium oxide barium oxide, magnesium oxide, or calcium oxide.

BRIEF DESCRIPTION OF THE SEVERAL VIEWS OF THE DRAWING

The drawings constitute a part of this specification and include exemplary embodiments of the invention, which may be embodied in various forms.

DETAILED DESCRIPTION OF THE INVENTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Ceramic fiber-based substrate materials are useful for high temperature insulation, filtration, and for hosting catalytic reactions. The materials, in any of a variety of forms, can be used in high temperature applications as catalytic converters, NOx adsorbers, DeNox filters, multi-function filters, molten metal transport mechanisms and filters, regenerator cores, chemical processes, fixed-bed reactors, hydrodesulfurization, hydrocracking or hydrotreating, and engine exhaust filtration.

Powder-based ceramic materials can be fabricated in a porous form, through the use of organics and pore formers that are volatized during sintering. Alternatively, the sintering process for powder-based ceramic honeycomb substrates can result in a densification of the ceramic precursors, resulting in the inclusion of pores and void space throughout the sintered substrate material. The porous substrate fabricated from powder-based materials is significantly compromised. As porosity exceeds 50%, the powder-based substrate becomes much weaker and subject to mechanical failure in any high temperature or thermally-stressed application. Additionally, the porosity of a powder-based substrate is not typically useful for filtration applications, as the void space and pores caused from densification of the raw materials and/or through the volatization of organics, is not well interconnected. When pore space is not well interconnected, as it is with a fiber-based substrate, the substrate material is not permeable to the flow of gas or fluid through the material.

The high porosity, and high effective surface area provided by a fibrous microstructure provides excellent strength at low mass, and can survive wide and sudden temperature excursions without exhibiting thermal shock or mechanical degradation. Ceramic fibers can also be used to fabricate high temperature rigid insulating panels, such as vacuum cast boards, used for lining combustion chambers and high temperature environments that require impact resistance. Casting processes can also be used to from rigid structures of ceramic fibers such as kiln furniture and setter tiles.

As used herein, a fiber is a form of material where the aspect ratio, i.e., length divided by width, is greater than one. The cross section of a fiber is commonly circular in shape, though other cross sectional shapes, such as triangular, rectangular, or polygonal, are possible. Additionally, the width of the fiber may be variable over the length of the fiber or fiber section. Material compositions of many types can be provided in a fiber form. Generally, a fiber is produced by any one of a number of processes, including without limitation, spun, blown, drawn, or sol-gel processes. Most ceramic fibers used for refractory insulation, such as aluminosilicate or alumina fibers, have a diameter or width of about 1 micron to about 25 microns, and more typically, 3 microns to about 10 microns. One skilled in the art will appreciate that the shape of fibers as a raw material for the production of porous fibrous substrates is in sharp contrast to the more typical ceramic powder materials, where the aspect ratio is approximately one.

Figure 1:
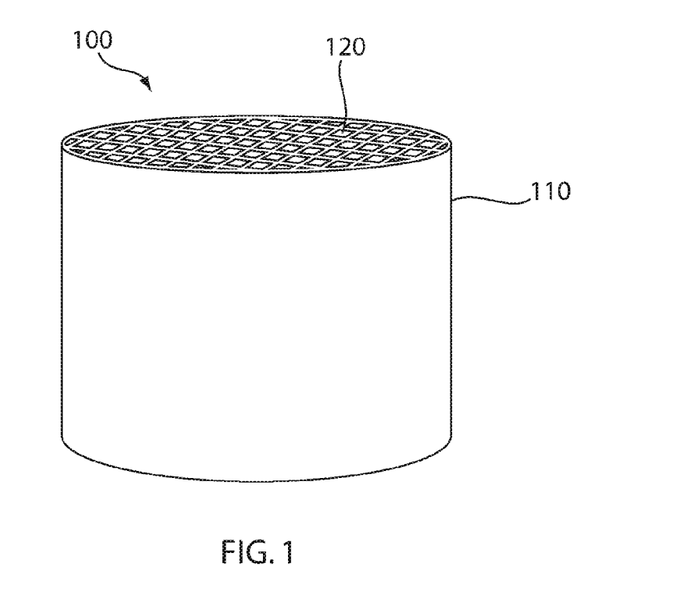
FIG. 1 depicts a honeycomb substrate according to the present invention.
Figure 2:
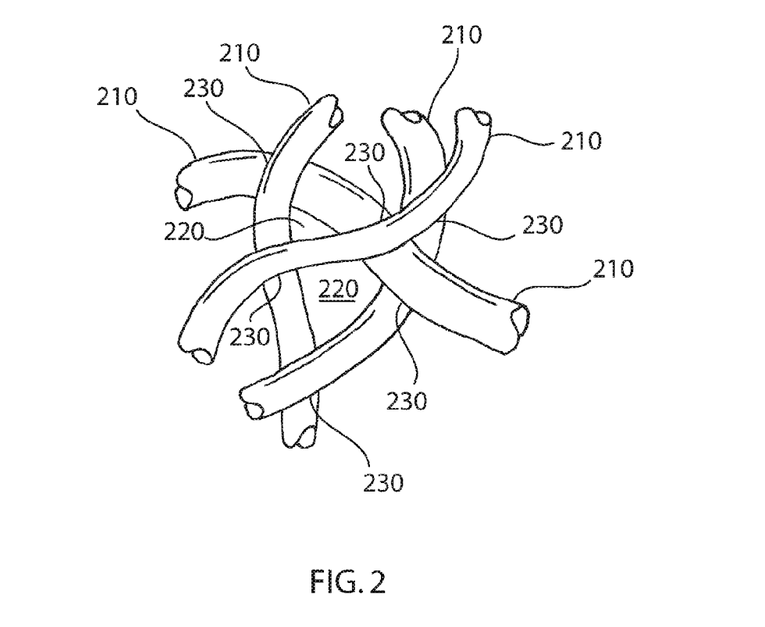
FIG. 2 illustrates an enlarged area of the porous microstructure of the honeycomb substrate of the present invention.

FIG. 1 depicts a honeycomb substrate according to the present invention. The substrate 100 has a honeycomb array of walls 110 defining channels 120 between adjacent walls. The substrate 100, and more particularly, the walls 110, are composed of a porous microstructure of a fiber-based material having an aluminum titanate composition. Referring to FIG. 2, an enlarged area of the porous microstructure 200 is illustrated. Pore space 220 is created from space between overlapping and inter-tangled fibers 210. Overlapping and inter-tangled fibers 210 are bonded to adjacent fibers with sintered bond and/or through a bonding matrix 230, such as a glass, glass-ceramic or ceramic bond.

The use of fiber to strengthen articles is generally known in the art. Common fiber reinforced composites comprise a structure of fibers and a matrix. The fibers provide strength while the matrix glues the fibers together to transfer stress between the reinforcing fibers. Honeycomb ceramic substrates have been known to include small amounts of fibers to provide strengthening and reinforcement of the honeycomb structure. In the method and apparatus of the present invention, however, the fibers are the matrix, with porosity and permeability of the substrate resulting from the space between adjacent and overlapping fibers, with the strength and support of the matrix resulting from bonds between the adjacent and overlapping fibers. A key distinction between the structure of the present invention and that of a fiber-reinforced article is that the fibers of the present invention react with adjacent and adjoining fibers and/or with the bonding matrix to form a generally homogeneous composite material.

Aluminum titanate ($Al_2TiO_5$) is an orthorhombic crystal structure that forms a stable microcracked structure in sintered polycrystal or amorphous materials. Aluminum titanate is a stable oxide ceramic material that is highly regarded for exhibiting excellent thermal shock resistance, due to an extremely low coefficient of thermal expansion (CTE). Ceramic materials with a low CTE are desirable in applications where thermal gradients may exist. For example, in a diesel particulate filter, a thermal gradient can form when the soot accumulated in the filter is periodically regenerated. Regeneration of a diesel particulate filter involves burning off accumulated soot to oxidize the accumulated soot into carbon dioxide and water vapor. Thermal gradients in excess of 800 degrees Celsius in a filter can develop, which can induce thermal stress that could exceed the strength of the ceramic material. When a material having a low CTE is used, the resulting thermal stresses from high thermal gradients can be reduced accordingly.

Porous honeycomb substrates composed of aluminum titanate are previously known to be fabricated using powder-based raw materials. The effective range of porosity is limited as the aluminum titanate substrate from powder-based materials becomes mechanically weak when porosity exceeds approximately 50%. A porous aluminum titanate substrate according to the present invention, that is fabricated using fiber-based raw materials, using extrusion methods to produce a honeycomb substrate, can provide a porous aluminum titanate honeycomb substrate having a porosity of 50% or greater, with sufficient mechanical strength and other thermal and mechanical properties. Furthermore, the extrusion of fiber-based raw materials into a honeycomb form can result in a preferred orientation of the fiber—i.e., fibers aligned in the extrusion direction. In so doing, the fiber alignment (which can be controlled or influenced by the mechanical properties of the fiber raw materials, such as strength resulting from diameter, length, and composition), can impart anisotropic CTE characteristics, including low CTE properties in the direction of the substrate that may experience the largest thermal gradients in operation.

Figure 3:
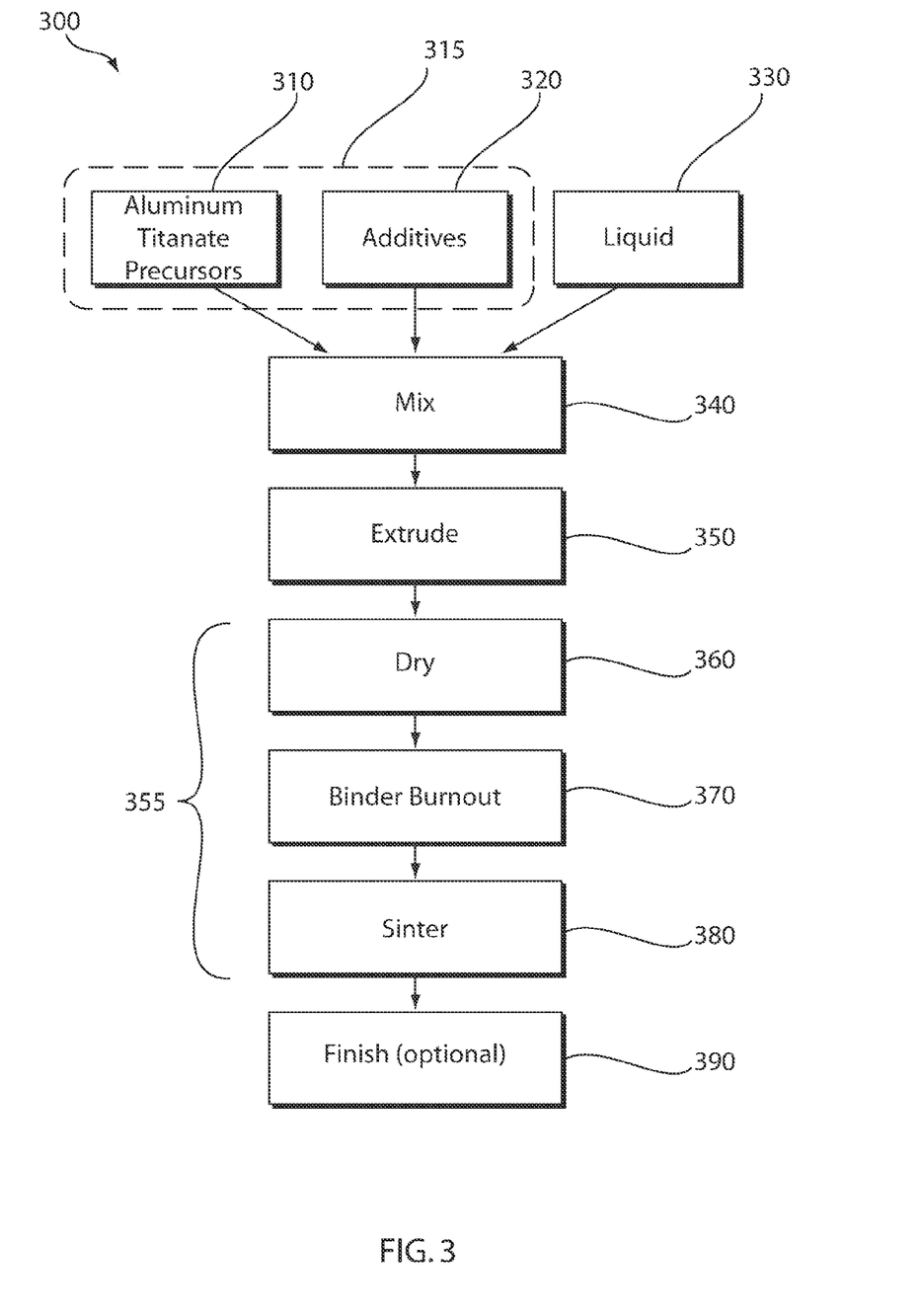
FIG. 3 is a flowchart describing a method of producing a porous aluminum titanate honeycomb substrate according to the present invention.

Referring now to FIG. 3, a method of producing a porous aluminum titanate honeycomb substrate is shown according to the present invention. Generally, the method 300 uses an extrusion process to extrude a green substrate that can be cured into the final highly porous substrate. The extrusion process of the method 300 provides flexibility in the size, shape, and geometry of the substrate, in that the extrusion dies and extrusion equipment can be adapted for a particular configuration.

Generally, aluminum titanate precursors 310 are mixed with additives 320 and a liquid 330 at a mixing step 340. The aluminum titanate precursors 310 include at least aluminum oxide, or alumina ($Al_2O_3$), and titanium dioxide, or titania ($TiO_2$). In order to provide the open network of porosity, at least a portion of the materials must be in fiber form 315. Both the alumina precursor and the titania precursor can be readily provided in a fiber form. Both precursors can be in fiber form, or the precursors can be provided in powder form and/or in a colloidal solution, with at least a portion of one of the precursors in a fiber form. Both precursors can be in powder form and/or a colloidal solution, with the additives in fiber form. Alternatively, aluminum titanate fibers can be included with the aluminum titanate precursors 310.

Alternatively, aluminum titanate precursors 310 can include additional compounds that may result in non-stoichiometric aluminum titanate. For example, aluminosilicate materials, such as an amorphous 50% alumina/50% silicon dioxide (silica), is readily available in fiber form, that can be combined with powdered titanium dioxide to form a structure having a composite composition of aluminum titanate and mullite and/or aluminum titanate, mullite and a silica-based glass. Further still, mullite fiber can be included with titanium dioxide fiber to provide a similar aluminum titanate-mullite-glass composite. In another embodiment, the precursors can be in powder (and/or colloidal) form, with the additives comprising silica fiber, to form an aluminum titanate structure around the silica fiber, or alternatively, a mullite fiber that was formed from a reaction of appropriate quantities of alumina from the precursors with the silica fiber. These composite structures can be in the form of an aluminum titanate coating that is formed on the fiber additive. Specific examples of various embodiments are provided below.

The additives 320 include binders, dispersants, pore formers, plasticizers, processing aids, and strengthening materials. Binders include organic and inorganic materials and extrusion or forming aids, rheology modifiers and processing aids and plasticizers that may be useful during the subsequent extrusion step 350. For example, organic binders that can be included as additives 320 include methylcellulose, hydroxypropyl methylcellulose (HPMC), ethylcellulose and combinations thereof. Organic binders can include, without limitation, thermoplastic resins, such as: polyethylene; polypropylene; polybutene; polystyrene; polyvinyl acetate; polyester; isotactic polypropylene; atactic polypropylene; polysulphone; polyacetal polymers; polymethyl methacrylate; fumaron-indane copolymer; ethylene vinyl acetate copolymer; styrene-butadiene copolymer; acryl rubber; polyvinyl butyral; and inomer resin. Organic binders can include, without limitation, thermosetting binders, such as: epoxy resin; nylon; phenol formaldehyde; and phenol furfural; waxes; paraffin wax; wax emulsions; and microcrystalline wax. Organic binders can also include, without limitation, celluloses; dextrines; chlorinated hydrocarbons; refined alginates; starches; gelatins; lignins; rubbers; acrylics; bitumens; casein; gums; albumins; proteins; and glycols. The additives 320 may typically include sintering aids, in relatively small amounts, such as less than 1% by weight, such as magnesium carbonate, or others, to promote the formation of aluminum titanate at lower sintering temperatures, without significantly altering the properties of the resulting aluminum titanate composition, such as, for example, the CTE. The additives 320 can also include stabilizing compounds that inhibit the potential for decomposition of the aluminum titanate material during operation, for example, as a diesel particulate filter. Stabilizing compounds can include trace quantities of silica, magnesium oxide, and/or iron oxide.

Inorganic binders can be included as additive 320, such as, for example: soluble silicates; soluble aluminates; soluble phosphates; ball clay; kaolin; bentonite; colloidal silica; colloidal alumina; and borophosphates. These inorganic binders provide plasticity and extrudability, and also contribute to the formation of a composite structure with the aluminum titanate precursors 310. Water soluble binders can be included as additives 320, including, for example: hydroxypropyl methyl cellulose; hydroxyethyl cellulose; methyl cellulose; sodium carboxymethyl cellulose; polyvinyl alcohol; polyvinyl pyrrolidone; polyethylene oxide; polyacrylamides; polyethyterimine; agar; agarose; molasses; dextrines; starch; lignosulfonates; lignin liquor; sodium alginate; gum arabic; xanthan gum; gum tragacanth; gum karaya; locust bean gum; irish moss; scleroglucan; acrylics; and cationic galactomanan.

Additives 320 can also include plasticizers, that may include, without limitation: stearic acid; polyethylene glycol; polypropylene glycol; propylene glycol; ethylene glycol; diethylene glycol; triethylene glycol; tetraethylene glycol; dimethyl phthalate; dibutyl phthalate; diethyl phthalate; dioctyl phthalate; diallyl phthalate; glycerol; oleic acid; butyl stearate; microcrystalline wax; paraffin wax; japan wax; carnauba wax; bees wax; ester wax; vegetable oil; fish oil; silicon oil; hydrogenated peanut oil; tritolyl phosphate; clycerol monostearate; and organo silane.

Additives 320 can also include pore formers that enhance the size and distribution of pores in the porous substrate 100. Pore formers are added to increase open space in the final porous substrate. Pore formers are selected not only for the ability to create open space and based upon their thermal degradation behavior, but also for assisting in orienting the fibers during mixing and extrusion. In this way, the pore formers assist in arranging the fibers into an overlapping pattern to facilitate proper bonding between fibers during later stages of the sintering step 380. Additionally, pore formers may also play a role in the alignment of the fibers in preferred directions, which effect the thermal expansion characteristics of the extruded substrate along different axes. Pore formers as additives 320 can include, without limitation: carbon black; activated carbon; graphite flakes; synthetic graphite; wood flour; modified starch; starch; celluloses; coconut shell flour; husks; latex spheres; bird seeds; saw dust; pyrolyzable polymers; poly (alkyl methacrylate); polymethyl methacrylate; polyethyl methacrylate; poly n-butyl methacrylate; polyethers; poly tetrahydrofuran; poly (1,3-dioxolane); poly (alkalene oxides); polyethylene oxide; polypropylene oxide; methacrylate copolymers; polyisobutylene; polytrimethylene carbonate; poly ethylene oxalate; poly beta-propiolactone; poly delta-valerolactone; polyethylene carbonate; polypropylene carbonate; vinyl toluene/alpha-methylstyrene copolymer; styrene/alpha-methyl styrene copolymers; and olefin-sulfur dioxide copolymers.

As briefly described above, one or more fiber compositions can be included as aluminum titanate precursors 310. Additionally, additives 320 can be in powder, liquid solution or fiber form.

The liquid 330 is typically water, though other liquids, such as solvents can also be provided. Additionally, the precursors 310 and/or additives 320 can be provided in a colloidal suspension or solution, that may reduce or eliminate the amount of additional liquid 330 that may be required. The liquid 330 is added as needed to attain a desired rheology of the mixture suitable for the extrusion step 350. Rheological measurements can be made during the mixing step 340 to evaluate the rheology of the mixture compared with a desire rheology for the extrusion step 350. Excess liquid 330 may not be desirable in that excessive shrinking may occur during the curing step 355 that may induce the formation of cracks in the substrate.

The precursors 310, additives 320 and fluid 330 are mixed in the mixing step 340 to provide an extrudable mixture. The mixing step 340 may include a dry mix aspect, a wet mix aspect, and a shear mix aspect. It has been found that shear or dispersive mixing is desirable to produce a highly homogenous distribution of fibers within the mixture. This distribution is particularly important due to the relatively low concentration of ceramic material in the mixture. Shear mixing is necessary to break up and distribute the fibers within the mixture. A sigma mixer, or equivalent equipment, is suitable for performing the mixing step 340. As the homogeneous mixture is being mixed, the rheology of the mixture may be adjusted as necessary. As the mixture is mixed, its rheology continues to change. The rheology may be subjectively tested, or it may be measured to comply with rheological values known to those skilled in the art.

The extrudable mixture is then extruded into a green substrate at extrusion step 350. In the case of screw extruders, the mixing step 340 can be performed nearly contemporaneously as the extrusion step 360 to provide a continuous in-line processing at high volume. Alternatively, a batch process in a piston extruder can also be performed to extrude the mixture into a green substrate. A honeycomb form can be attained by extruding the mixture through a honeycomb extrusion die. The honeycomb cell size and geometry, such as cell density and wall thickness, is determined by the extrusion die design. The green substrate has sufficient green strength to support the substrate and maintain the extruded shape and form for subsequent processing.

The curing sequence 355 consists essentially of a drying step 360, a binder burnout step 370 and a sintering step 380. The drying step 360 is performed to remove nearly all the liquid in the green substrate, and to solidify or gelate the binder component of the additives 320. The drying step 360 may be typically performed at relatively low temperatures in an oven, or alternative drying methods can be employed, such as microwave, infrared, or controlled humidity drying systems. It has been shown that drying the green substrates in an infrared or microwave drying oven to remove more than 98% of the fluid, such as water, is an acceptable to the extent that cracking or failures from rapid shrinkage in subsequent high temperature processing is reduced or eliminated.

The binder burnout step 370 is performed to remove additives 320 that are at least partially volatile at elevated temperatures, such as organic materials. These additives can be burned off in a controlled manner to maintain the alignment and arrangement of the fiber, and to ensure that escaping gas and residues do not interfere with the fiber structure. As the additives burn off, the fibers maintain their overlapping arrangement, and may further contact adjacent and overlapping fibers at intersecting point or nodes within the structure. The fibers have been positioned into these overlapping arrangement using the binder, for example, and may have particular patterns formed through the use of any pore former additives. The specific timing and temperature, and environment to remove the additives 320 during the binder burnout step 370 depends on the additives selected. For example, if HPMC is used as an additive 320 for an organic binder with graphite particles as an additive 320 for a pore former, the binder burnout step 370 can selectively remove the additives by heating the green substrate to approximately 325° C. to thermally disintegrate the HPMC, and then heating the green substrate to approximately 600° C. in an environment purged with air to oxidize the graphite into carbon dioxide.

The sintering step 380 is then performed to form aluminum titanate from the aluminum titanate precursors 310. In this sintering step 380, the fiber-based components 315 of the aluminum titanate precursors 310 and/or the additives 320 have been aligned and positioned from the extrusion process 350, with the volatile components of the additives 320 removed from the binder burnout step 370. Referring back to FIG. 2, the fiber based components of the aluminum titanate precursors 310 are represented as fibers 210, with the open pore space 220 formed from the volatile components of the additives 320 that had been removed in the binder burnout step 370, with the powder-based precursors and/or additives coating the fibers (not shown in FIG. 2 for clarity). The sintering step 380 heats the substrate to a temperature in an environment sufficient to form aluminum titanate from a reaction of the aluminum titanate precursors 310, while forming a rigid and porous structure based on the fiber component of the aluminum titanate precursors.

The composition of the porous substrate depends on the relative quantity of the aluminum titanate precursors 310 and non-volatile additives 320. For example, a near-homogeneous aluminum titanate composition can be reaction-formed when the aluminum titanate precursors 310 include a stoichiometric ratio of alumina and titanium dioxide, with the formation of aluminum titanate from its precursors described in the following formula: $Al_2O_3 + TiO_2 \rightarrow Al_2TiO_5$. Referring still at FIG. 2, the bonds between adjacent and overlapping fibers 230 are formed in the stoichiometric aluminum titanate structure from sintered bonds during the formation of aluminum titanate.

The composition of the porous substrate according to the present invention can include composite structures including aluminum titanate, and/or various bonding phases that can be formed to provide a rigid structure. If the relative quantities of the aluminum titanate precursors 310 include excess alumina, aluminum titanate will form within a matrix of alumina. Similarly, if the relative quantities of the aluminum titanate precursors 310 include excess titanium dioxide, aluminum titanate will form within a matrix of titanium dioxide.

Furthermore, the aluminum titanate precursors can include additional compounds that result in the formation of a composite structure. During the sintering step 380, aluminum titanate will form, within a matrix of a materials having a composition commensurate with the composition of the precursor materials. For example, the aluminum titanate precursors 310 can be aluminosilicate materials, such as amorphous aluminosilicate fiber, and titanium dioxide. During sintering 380, aluminum titanate will form from equal relative quantities of alumina and titanium dioxide, with remaining silica and alumina forming mullite, and/or silicates, including glass compounds. In some cases, inorganic additives 320, such as clay or glass precursors, may be consumed during the sintering step 380 or remain as a part of the final substrate composition.

Other aluminum titanate precursors 310 and additives 320 can be used to form other aluminum titanate composite structures. For example, aluminum titanate precursors 310 and/or additives 320 containing alumina, silica, strontium dioxide, barium oxide, calcium oxide and magnesium oxide can be used to form fibrous aluminum titanate structures with or within a matrix of a composite with any combination of these elements.

Figure 4:
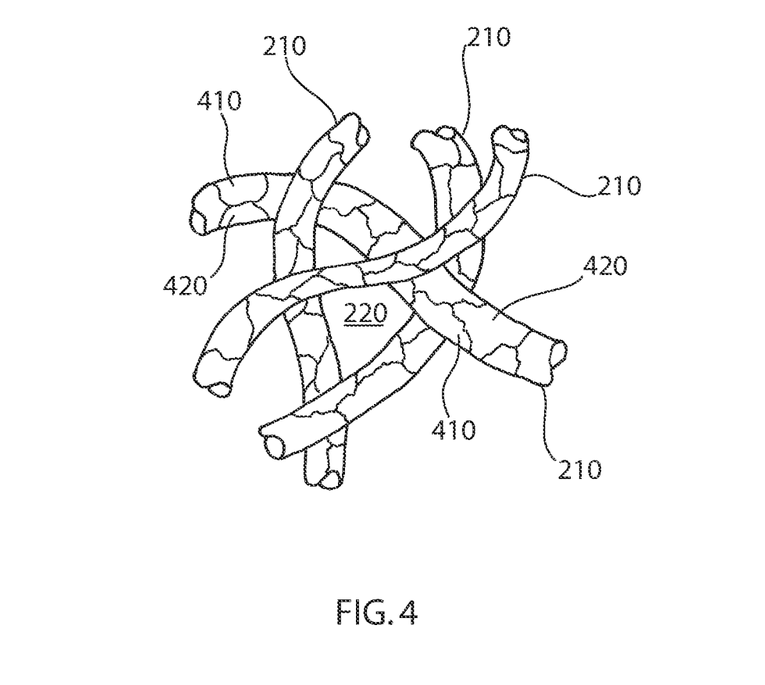
FIG. 4 illustrates an enlarged area of the porous microstructure of the honeycomb substrate of an embodiment of the present invention.

Referring to FIG. 4, a composite aluminum titanate structure is shown. The fibers 210 dictate the overall microstructure that defines the pore space 220, and the size and distribution of such pore space 220. In this composite form, the fibers 210 are composed of regions of aluminum titanate 410 within regions of the composite material 420. The size and distribution of the respective aluminum titanate regions 410 and composite regions 420 can be determined by the respective quantities of the aluminum titanate precursors 310 and/or the additives 320, and controlled by the sintering time, temperature, and environment during the sintering step 380.

Figure 5:
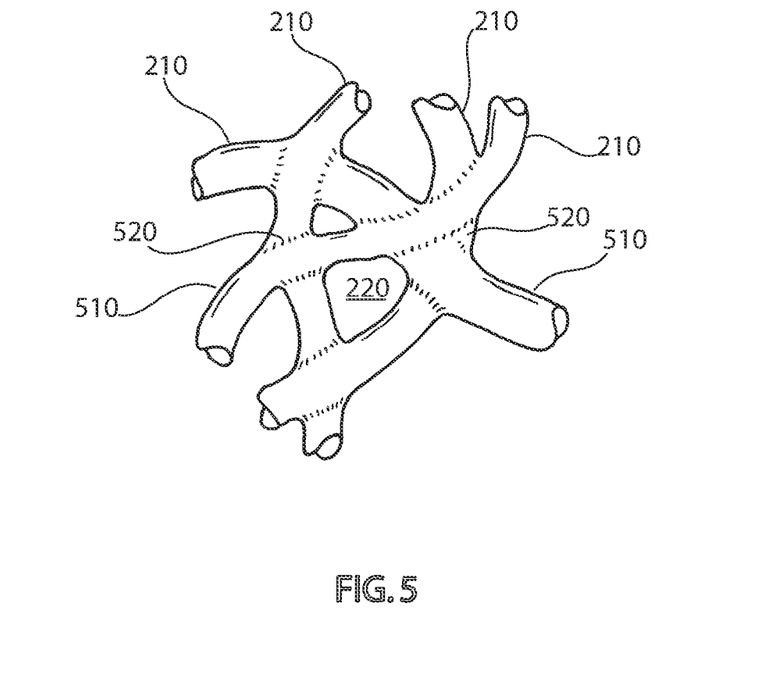
FIG. 5 illustrates an enlarged area of the porous microstructure of the honeycomb substrate of an alternate embodiment of the present invention.

Referring to FIG. 5, a composite aluminum titanate structure is shown. The fibers 210 dictate the overall microstructure that defines the pore space 220, and the size and distribution of such pore space 220. In this composite form, the fibers 210 are composed of regions of aluminum titanate 510 within a glass matrix 520. The glass matrix can coat the fibers 210, or it can form bonds at the nodes of the overlapping and adjacent fibers, as described above.

EXAMPLES

The following examples are provided to further illustrate and to facilitate the understanding of the disclosure. These specific examples are intended to be illustrative of the disclosure and are not intended to be limiting.

In a first illustrative example precursors in the form of alumina fiber and titanium dioxide powder are used in an approximately equal molar ratio to form an aluminum titanate porous substrate. An extrudable mixture was prepared with 29.31% by weight alumina fiber, 15.00% by weight titanium dioxide powder, 25.94% by weight graphite particles (−325 mesh grade), 6.38% by weight hydroxypropyl methylcellulose (HPMC), 0.80% by weight magnesium carbonate as a sintering aid, and 31.92% by weight deionized water. The materials were mixed into the extrudable mixture and formed into 1" diameter honeycomb substrates by extrusion. The substrates were dried using a radio-frequency (RF) dryer, followed by a binder burnout step at 325° C. for approximately one hour with a nitrogen purge to decompose the organic binder, and 1,000° C. for approximately four hours with an air purge to burn out the graphite pore former. The material is then sintered at 1,550° C. for three hours to form the porous aluminum titanate substrate. An x-ray diffraction (XRD) analysis of the substrate material indicated a composition of approximately 88% aluminum titanate, with the balance of the composition including mullite, rutile (titanium dioxide), and other amorphous materials. The porosity was measured to be 64.1% with a cold crush strength of approximately 400 psi.

In a second illustrative example, precursors in the form of alumina fiber and titanium dioxide powder are used in a molar ratio having an excess of alumina to form an aluminum titanate porous substrate. An extrudable mixture was prepared with 20.58% alumina fiber, 12.35% by weight titanium dioxide powder, 26.75% by weight graphite particles (−325 mesh grade), 6.58% by weight hydroxypropyl methylcellulose (HPMC), 0.82% by weight magnesium carbonate as a sintering aid, and 32.92% by weight deionized water. The materials were mixed into the extrudable mixture and formed into 1" diameter honeycomb substrates by extrusion. The substrates were dried using a radio-frequency (RF) dryer, followed by a binder burnout step at 325° C. for approximately one hour with a nitrogen purge to decompose the organic binder, and 1,000° C. for approximately four hours with an air purge to burn out the graphite pore former. The material is then sintered at 1,550° C. for three hours to form the porous aluminum titanate substrate. The porosity was measured to be 55.6% with a cold crush strength of approximately 905 psi.

In a third illustrative example, precursors in the form of mullite fiber and titanium dioxide powder are used to form an aluminum titanate porous substrate. Mullite fiber is a polycrystalline material comprising alumina and silica in the mullite phase. An extrudable mixture was prepared with 20.58% by weight mullite fiber, 11.52% by weight titanium dioxide powder, 26.75% by weight graphite particles (−325 mesh grade), 6.58% by weight hydroxypropyl methylcellulose (HPMC), 1.65% by weight strontium carbonate powder, and 32.92% by weight deionized water. The materials were mixed into the extrudable mixture and formed into 1" diameter honeycomb substrates by extrusion. The substrates were dried using a radio-frequency (RF) dryer, followed by a binder burnout step at 325° C. for approximately one hour with a nitrogen purge to decompose the organic binder, and 1,000° C. for approximately four hours with an air purge to burn out the graphite pore former. The material is then sintered at 1,400° C. for three hours to form the porous aluminum titanate substrate. An x-ray diffraction (XRD) analysis of the substrate material indicated a composition of approximately 66% aluminum titanate, 7% mullite, 5% rutile (titanium dioxide), with the balance forming an amorphous bonding matrix. The porosity was measured to be 61.3% with a cold crush strength of approximately 939 psi. In this example, the mullite fiber provided the alumina precursor that formed aluminum titanate in a reaction using the titanium dioxide precursor. The porosity resulting from the open pore network is defined by the position and orientation of the mullite fiber in the extruded green substrate, that was preserved in the subsequent curing steps.

In a fourth illustrative example, precursors in the form of mullite fiber and titanium dioxide powder are used to form an aluminum titanate porous substrate. An extrudable mixture was prepared with 20.86% by weight mullite powder, 11.90% by weight titanium dioxide powder, 27.14% by weight graphite particles (−325 mesh grade), 6.68% by weight hydroxypropyl methylcellulose (HPMC), and 33.40% by weight deionized water. The materials were mixed into the extrudable mixture and formed into 1" diameter honeycomb substrates by extrusion. The substrates were dried using a radio-frequency (RF) dryer, followed by a binder burnout step at 325° C. for approximately one hour with a nitrogen purge to decompose the organic binder, and 1,000° C. for approximately four hours with an air purge to burn out the graphite pore former. The material is then sintered at 1,500° C. for three hours to form the porous aluminum titanate substrate. An x-ray diffraction (XRD) analysis of the substrate material indicated a composition of approximately 66% aluminum titanate, 5% mullite, 9% titanium dioxide with the balance forming an amorphous bonding matrix. The porosity was measured to be 65.3% with a cold crush strength of approximately 548 psi. The porosity resulting from the open pore network is defined by the position and orientation of the mullite fiber in the extruded green substrate, that was preserved during the subsequent curing steps.

Referring back to FIG. 3, the finishing step 390 can be optionally performed to configure the aluminum titanate substrate for its intended application. The finishing step 390 can include plugging alternate cells of the honeycomb substrate to configure the substrate as a wall-flow filter. Additionally, the substrate can be cut or ground into a geometric shape for its intended purpose, such as a rectangular or cylindrical cross-section. In some applications, it may be desirable to assemble a large substrate from a number of smaller segments by gluing a plurality of segments using a high temperature adhesive material. Additionally, an outer skin or coating can be applied to attain a desired finished size and surface condition. The finished aluminum titanate substrate can be inserted into a metal sleeve or can to provide a housing in an emission control device, such as, for example, a diesel particulate filter. One skilled in the art will appreciate other applications to which a high porosity honeycomb substrate having an aluminum titanate composition can be adapted for use.

The foregoing has been a detailed description of illustrative embodiments of the invention. Various modifications and additions can be made without departing from the spirit and scope if this invention, and each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, where aluminum titanate precursors and other additives are provided to the mixture, various compositions and composites can be formed including aluminum titanate. In addition, further modifications to the drying, binder burnout and/or sintering steps may be implemented in conjunction with adjustments to the mixture constituents contemplated herein. Also while the variation of relative quantities of aluminum titanate precursors are provided, the relative quantity of aluminum titanate in the sintered substrate be taken broadly to include any fibrous aluminum titanate composite honeycomb structure, including, without limitation, glass bonded, glass-ceramic bonded, and ceramic bonded aluminum titanate materials. Accordingly, this description is meant to be taken only by way of example, and not to otherwise limit the scope of this invention.

What is claimed is:

1. A fibrous honeycomb substrate comprising:
   a honeycomb array of walls defining channels between adjacent walls;
   the walls comprising a plurality of fibers forming a porous structure having an open network of pores, the plurality of fibers overlapping and inter-tangled, the porous structure having a porosity greater than 50%; and
   the walls having a composition comprising aluminum titanate.

2. The substrate according to claim 1 further comprising a bonding matrix between adjoining ones of the plurality of fibers.

3. The substrate according to claim 2 wherein the bonding matrix comprises at least one of a glass, glass-ceramic and ceramic material.

4. The substrate according to claim 2 wherein the bonding matrix comprises aluminum titanate.

5. The substrate according to claim 1 wherein the walls having a composition further comprising mullite.

6. The substrate according to claim 1 wherein the walls further comprise a plurality of fibers having a composite composition of aluminum titanate and at least one of a silicate.

7. The substrate according to claim 1 wherein the walls further comprise a plurality of fibers having a composite composition of aluminum titanate and strontium oxide.

8. The substrate according to claim 1 wherein the walls further comprise a plurality of fibers having a composite composition of aluminum titanate and barium oxide.

9. The substrate according to claim 1 wherein the walls further comprise a plurality of fibers having a composite composition of aluminum titanate and calcium oxide.

10. The substrate according to claim 1 wherein the walls further comprise a plurality of fibers having a composite composition of aluminum titanate and magnesium oxide.

11. A method of manufacturing a fibrous substrate, the method comprising:
    mixing precursors comprising aluminum oxide and titanium dioxide, with additives and a fluid to provide an extrudable mixture, at least one of the precursors and additives comprising a fiber;
    extruding the extrudable mixture into a honeycomb green substrate; removing the fluid and the additives; and
    sintering the honeycomb green substrate to form a porous honeycomb substrate having an aluminum titanate composition using the precursors, the porous honeycomb substrate having an open pore network defined by the fiber.

12. The method according to claim 11 wherein the precursors comprising aluminum oxide are provided in approximately the same relative molar ratio as the precursors comprising titanium dioxide.

13. The method according to claim 11 wherein the precursors comprising aluminum oxide are provided in a relative molar ratio that is greater than the relative molar ratio of the precursors comprising titanium dioxide.

14. The method according to claim 11 wherein the precursors comprising aluminum oxide are provided in a relative molar ratio that is less than the relative molar ratio of the precursors comprising titanium oxide.

15. The method according to claim 11 wherein the precursors further comprise at least one of silicon dioxide, strontium oxide, barium oxide, and calcium oxide.

16. The method according to claim 11 wherein the precursors comprising aluminum oxide comprises alumina fiber.

17. The method according to claim 16 wherein the precursors comprising titanium dioxide comprises titania fiber.

18. The method according to claim 11 wherein the fiber comprises approximately 15% to 50% by volume.

19. An extruded porous honeycomb substrate comprising: porosity in the range of about 50% to about 85%; and
    the substrate having a structure formed of overlapping and inter-tangled bonded ceramic fibers, the bonded fibers having a composition of aluminum titanate.

20. The extruded porous honeycomb substrate according to claim 19 wherein the overlapping and inter-tangled bonded ceramic fibers further comprise a bonding matrix comprising at least one of glass, glass-ceramic and ceramic.

21. The extruded porous honeycomb substrate according to claim 20 wherein the bonding matrix further comprises aluminum titanate.

22. The extruded porous honeycomb substrate according to claim 19 wherein the composition further comprises a composite matrix of aluminum titanate and at least one of silicon dioxide, strontium oxide, barium oxide, and calcium oxide.

* * * * *